Patented Nov. 28, 1933

1,937,328

UNITED STATES PATENT OFFICE 1,937,328

PRODUCTION OF CARBAMIC ACID CHLORIDE

Erich Theis, Mannheim, Germany, assignor to I. G. Farbenindustrie Aktiengesellschaft, Frankfort-on-the-Main, Germany No Drawing. Application December 30, 1932, Serial No. 649,594, and in Germany January 7, 1932

5 Claims. (Cl. 260—123)

The present invention relates to the production of carbamic acid chloride.

It has already been proposed to prepare carbamic acid chloride ($NH_2-COCl$) by the action of phosgene on ammonium chloride at 400° C. This process has, however, hitherto not acquired any practical importance because several difficulties are encountered, as for example clogging by reason of the high sublimation tendency of the ammonium chloride, so that the yields of carbamic acid chloride are very unsatisfactory.

I have now found that the said reaction proceeds very smoothly and that excellent yields of carbamic acid chloride are obtained by working at temperatures at least 60° below 400° C., but at least 150° above zero C., preferably at between about 200° and about 300 C. In this manner the sublimation of ammonium chloride may be wholly, or practically wholly, prevented.

The simplest method of carrying out the process is by leading phosgene at the said temperature over ammonium chloride in the form of pieces, such as lumps of at least pea size, tablets or briquettes. If desired, phosgene and finely divided ammonium chloride may be blown into a reaction vessel heated to the desired temperature, or phosgene may be blown through a layer of ammonium chloride which is kept in motion by the blast of phosgene or of a mixture thereof with inert gases. The resulting carbamic acid chloride may be separated from the effluent mixture of vapours in a liquid, pure state by cooling. It is preferable to subject the resulting mixture of vapours to a cooling as strongly and rapidly as possible to temperatures between about 30° and 0° C. after leaving the reaction chamber. This is advantageously effected in stages by first subjecting the vapours to a cooling lasting but a short time, separating the main quantity of vaporous carbamic acid chloride formed from the current of vapours preferably by cooling and then further cooling and liquefying and separating the remainder of the carbamic acid chloride by further cooling. Remaining mixtures containing phosgene may be employed in circulation for the conversion, if desired after the removal of any hydrogen chloride formed as a by-product. The process may also be carried out in a continuous manner by drawing off pulverulent remainders of ammonium chloride at the bottom of the vessel employed continuously or intermittently while simultaneously introducing fresh ammonium chloride at the top of the vessel. If desired, the phosgene may be diluted with inert gases, such as nitrogen, carbon monoxide, carbon dioxide, air or hydrogen chloride or mixtures thereof.

According to this invention, the reaction may be carried out readily and surely, and a practically complete conversion of the reaction components can be obtained without any difficulty. Apart from a saving of heat energy, the process according to this invention has, moreover, the advantage, which is important on an industrial scale, that the constructional material of the apparatus need not satisfy such high requirements as regards resistance to hydrogen chloride as when carrying out the reaction at considerably higher temperatures as hitherto proposed.

The following examples will further illustrate the nature of this invention, but the invention is not restricted to these examples.

Example 1

Phosgene is led at a temperature of 270° C. over ammonium chloride in the form of lumps of about the size of beans, the rate of flow being about 12 litres of phosgene per hour and per kilogram of ammonium chloride. The resulting carbamic acid chloride is recovered from the effluent vapours by cooling them with water to about 15° C. in a yield of 95 per cent of the theoretical yield calculated with reference to the phosgene employed.

When working at lower temperatures, as for example 245° or 225° C., somewhat smaller yields are obtained. The phosgene may also be employed after diluting it with inert gases, such as nitrogen, carbon monoxide, carbon dioxide, air or hydrogen chloride or mixtures thereof, the yields being only slightly decreased.

Example 2

A mixture of phosgene with four times its volume of air is passed through a pipe containing ammonium chloride at about 260° C. and the rate of about 60 litres per hour and per kilogram of ammonium chloride. Carbamic acid chloride is obtained in a yield of 70 per cent calculated on the amount of phosgene, which corresponds to 85 per cent of the yield obtainable with pure phosgene under otherwise identical conditions.

What I claim is:—

1. In the production of carbamic acid chloride from phosgene and ammonium chloride, the step which comprises reacting the said materials at a temperature between 150° and 340° C.

2. In the production of carbamic acid chloride from phosgene and ammonium chloride, the step which comprises reacting the said materials at a temperature between about 200° C. and about 300° C.

3. In the production of carbamic acid chloride from phosgene and ammonium chloride, the step which comprises passing phosgene over pieces of ammonium chloride at a temperature between about 200° and 300° C.

4. In the production of carbamic acid chloride from phosgene and ammonium chloride, the step which comprises passing phosgene over pieces of ammonium chloride at a temperature between about 200° and about 300° C. and cooling the resulting vaporous mixture to a temperature between 30° and 0° C.

5. In the production of carbamic acid chloride from phosgene and ammonium chloride, the step which comprises passing phosgene over pieces of ammonium chloride at a temperature between about 200° and about 300° C. and at the rate of about 12 liters of phosgene per hour and per kilogram of ammonium chloride.

ERICH THEIS.